April 24, 1934. C. A. CAMPBELL 1,955,871
CONNECTING MOUNT FOR AIR BRAKE VALVES
Filed Sept. 2, 1931
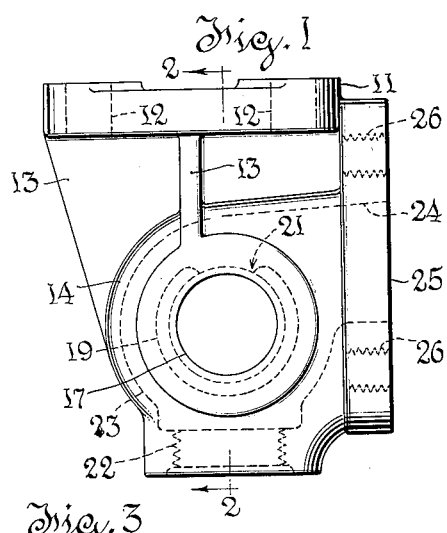
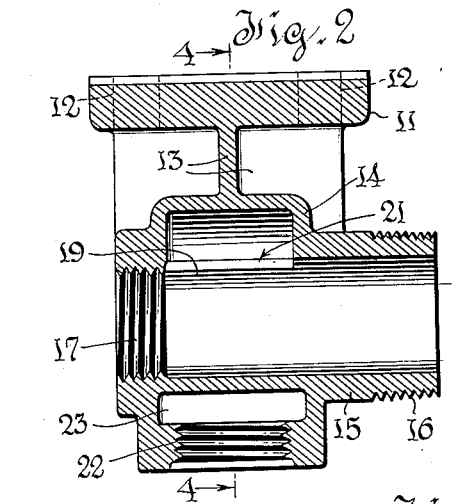
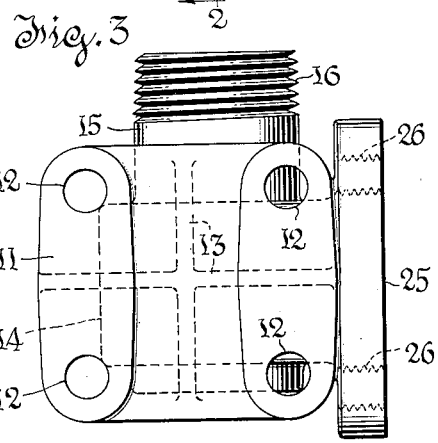
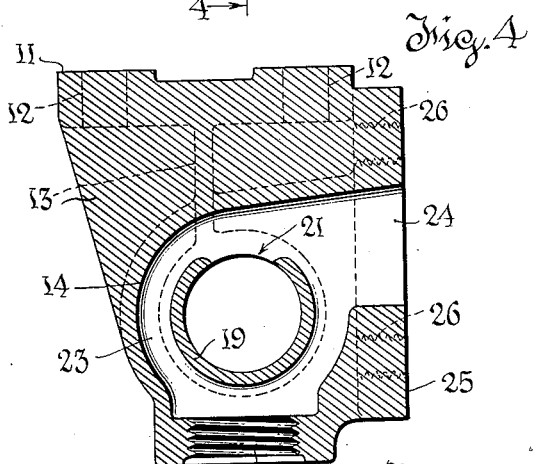
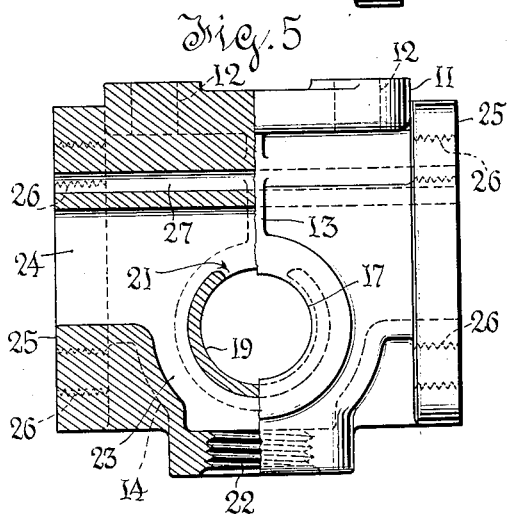
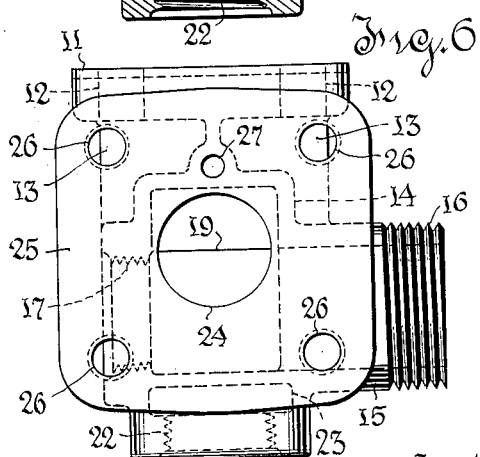
Inventor
Charles A. Campbell
By
Attorneys Patented Apr. 24, 1934

1,955,871

UNITED STATES PATENT OFFICE 1,955,871

CONNECTING MOUNT FOR AIR BRAKE VALVES

Charles A. Campbell, Watertown, N. Y., assignor to The New York Air Brake Company, a corporation of New Jersey Application September 2, 1931, Serial No. 560,806

8 Claims. (Cl. 303—1)

This invention relates to air brakes, and particularly to means for supporting a vent valve or vent valves in direct communication with the brake pipe.

According to existing standard practice in automatic air brakes, both emergency and service venting of the brake pipe are effected by movement of the triple valve which is located at the end of a branch pipe leading from the brake pipe. This means that the brake pipe reduction must penetrate from the brake pipe along the branch pipe to the triple valve, and that the venting which occurs at the triple valve will produce a pressure reduction wave which extends back along the branch pipe to the brake pipe. Obviously the branch pipe introduces an element of delay. To avoid this delay, and also to insure action of the vent valve independently of the triple valve, systems are in process of development in which the brake pipe vent valve functioning in emergency or valves functioning in both emergency and service, are constructed as units distinct from the triple valve. The most favorable location for such vent valves is directly on the brake pipe and preferably at the junction of the brake pipe with the branch pipe.

The purpose of the present invention is to produce what may be described as a combined vent valve mount and branch pipe T. As the vent valve mechanism is of substantial weight, it is desirable to provide the branch pipe T with means for connecting it directly with the framing or structure of a car.

Two embodiments of the invention are illustrated in the accompanying drawing, in which,—

Fig. 1 is an end elevation of the brake pipe T provided with a mounting face for an emergency vent valve, and offering connections for the brake pipe and branch pipe.

Fig. 2 is a section on the line 2—2 of Fig. 1 looking in the direction of the arrows.

Fig. 3 is a plan view.

Fig. 4 is a section on the line 4—4 of Fig. 2.

Fig. 5 is a view, partly in elevation and partly in section, showing the branch pipe T modified to receive two vent valves, one of which functions to produce service venting and the other of which functions to produce emergency venting.

Fig. 6 is an elevation looking to the left relatively to Fig. 5.

Referring first to Figs. 1 to 4 inclusive, 11 represents a bolting flange with bolt holes 12 intended for connection to the framing of a car. This is connected by webs 13 with a body or chamber 14. One side of this body is provided with a tubular extension 15 threaded as indicated at 16 to receive the nut of a union connection by means of which one portion of the brake pipe is connected with the body. Alined with the extension 15 is a threaded opening 17 intended to receive the end of the other portion of the brake pipe. While I prefer the threaded arrangement just described, it is within the scope of the invention to vary the threaded connections to meet the requirements of particular installations. In most cases connections such as shown in the drawing will be found satisfactory.

Extending through the chamber within the body 14, and forming what is in effect a continuation of the brake pipe, is an arcuate trough-like member 19 which is open at its top, as indicated at 21 in Fig. 4. The purpose of this extension is to keep scale and grit, which may be in the pipe, from discharging into the branch pipe.

The branch pipe connection leads to the bottom of the body 14 and is threaded as indicated at 22. As clearly indicated in Fig. 4 there is an ample annular space or passage 23 within the chamber 14 completely surrounding the member 19. Leading laterally from this annular space is a port 24 which terminates on a mounting face 25 formed on the side of the structure and having tapped holes 26 (indicated in dotted lines) to receive the attaching bolts for an emergency vent valve. The structure of this valve is not material to the present invention, and any vent valve responding to a reduction of brake pipe pressure and functioning to vent the brake pipe, might be used.

It will be observed that the fitting is amply supported and therefore offers support both to the brake pipe and to the vent valve; that the vent valve will communicate directly with the interior of the brake pipe, and that the branch pipe connection is conveniently located and at least partially protected against the entrance of scale from the brake pipe.

Referring now to Figs. 5 and 6, there is illustrated a modification of the structure of Figs. 1 to 4 intended to receive two vent valves. The purpose of using two vent valves is to provide for emergency venting and service venting independently of the response of the triple valve. In this way the desired sensitiveness can be secured, response will be had whether the triple valve responds or not, and all delay incident to the penetration of presure waves through the branch pipe will be eliminated.

In this structure the parts numbered 11 to 23 are essentially identical with the similarly numbered parts in Figs. 1 to 4, except that the bolting pad 11 is mounted symmetrically above the center of the brake pipe connections (compare Figs. 1 and 5). Instead of having a single mounting face 25 with bolt holes 26, there are two oppositely disposed mounting faces each provided with bolt holes 26, and each having a port 24 leading to the passage 23 and to the opening 21.

If the two vent valves operate entirely independently of each other the structure so far described is sufficient and may be used, but in one arrangement using two vent valves one for emergency and the other for service, the valves are connected with each other by a port which has, among other things, the function of establishing a definite relation between the actuating pistons of the two valves to insure that they will respond to different degrees or types of brake pipe reductions. For use with valves of this sort there is provided a port 27 which extends through the body 14. This port does not communicate with the ports 24 or with the brake pipe but is wholly isolated therefrom. It terminates at its ends in the two mounting faces 25 and merely serves as a duct or communication between the two pieces of apparatus supported on said mounting faces. The port is shown to illustrate the possibility of such connection, and one or more may be used as the design of the applied parts may require.

The invention is susceptible of various modifications, and while the structure illustrated is believed to have features of decided advantage, no limitation to this specific arrangement is implied, and the invention is defined in the accompanying claims.

What is claimed is,—

1. A mount for brake pipe vent valves comprising a hollow body having a supporting flange adapted for attachment to a car; and connections for a brake pipe, a connection for a branch pipe, and a ported mounting face for a brake pipe vent valve, said connections and the port in said mounting face communicating with the interior of said hollow body.

2. A mount for brake pipe vent valves comprising a body having a hollow chamber; a supporting flange carried by said body and adapted for attachment to a car; alined connections for a brake pipe leading to said chamber; a trough-like member open at its top within the chamber and forming a flow-defining continuation of the brake pipe between said connections; a branch pipe connection leading to said chamber; and a mounting face for a brake pipe vent valve, said face having a port leading to said chamber.

3. A mount for brake pipe vent valves comprising a hollow body having connections for a brake pipe, a connection for a branch pipe, and two ported mounting faces for a brake pipe vent valve, said connections and the ports in said mounting faces communicating with the interior of said hollow body.

4. A mount for brake pipe vent valves comprising a hollow body having supporting means for attaching the body to a car; and connections for a brake pipe, a connection for a branch pipe, and two ported mounting faces for brake pipe vent valves, said connection and the ports in said mounting faces communicating with the interior of said hollow body.

5. A mount for brake pipe vent valves comprising a hollow body having supporting means for attaching the body to a car; and connections for a brake pipe, a connection for a branch pipe, and two ported mounting faces for brake pipe vent valves, said connection and the ports in said mounting faces communicating with the interior of said hollow body, there being a connecting port between said mounting faces through said body, and isolated from the interior of said hollow body.

6. A mount for brake pipe vent valves comprising a body having a hollow chamber; alined connections for a brake pipe leading to said chamber; a trough-like member open at its top within the chamber and forming a flow-defining continuation of the brake pipe between said connections; a branch pipe connection leading to said chamber; and two mounting faces for brake pipe vent valves, each of said faces having a port leading to said chamber.

7. A mount for brake pipe vent valves comprising a body having a hollow chamber; means for attaching said body to a car; alined connections for a brake pipe leading to said chamber; a trough-like member open at its top within the chamber and forming a flow-defining continuation of the brake pipe between said connections; a branch pipe connection leading to said chamber; and two mounting faces for brake pipe vent valves, each of said faces having a port leading to said chamber.

8. A mount for brake pipe vent valves comprising a body having a hollow chamber; alined connections for a brake pipe leading to said chamber; a trough-like member open at its top within the chamber and forming a flow-defining continuation of the brake pipe between said connections; a branch pipe connection leading to said chamber; and two mounting faces for brake pipe vent valves, each of said faces having a port leading to said chamber, there being a connecting port between said mounting faces through said body and isolated from said chamber.

CHARLES A. CAMPBELL.